United States Patent [19]
Trafton et al.

[11] Patent Number: 6,076,415
[45] Date of Patent: Jun. 20, 2000

[54] BI-DIRECTIONAL, DUAL SPEED FILM TRANSPORT GEAR DRIVE APPARATUS WITH AN OPEN LOOP CONTROL GEAR MESH ROUTINE

[75] Inventors: R. Winfield Trafton, Holley; Duane J. Farling, Webster; Steven M. Bryant, Holley, all of N.Y.

[73] Assignee: Eastman Kodak Company, Rochester, N.Y.

[21] Appl. No.: 09/163,021

[22] Filed: Sep. 29, 1998

[51] Int. Cl.⁷ ............................... F16H 3/38; F16H 63/00
[52] U.S. Cl. ............................................. 74/339; 74/337.5
[58] Field of Search .................................. 74/337.5, 339, 74/810.1, 526; 475/12

[56] References Cited

U.S. PATENT DOCUMENTS

| | | | |
|---|---|---|---|
| 4,987,790 | 1/1991 | Weismann | 74/337.5 X |
| 5,249,666 | 10/1993 | Gorski et al. | 74/411.5 X |
| 5,862,705 | 1/1999 | Lee | 74/337.5 X |

FOREIGN PATENT DOCUMENTS 1002806  12/1949  France .................................. 74/337.5

*Primary Examiner*—Charles Marmor
*Assistant Examiner*—Roger Pang
*Attorney, Agent, or Firm*—Francis H. Boos, Jr.

[57] ABSTRACT

A dual speed film drive apparatus to achieve high speed and low speed film drive employs a limited speed range stepper motor with pinion input drive gear, and an output driven gear connected to a film advance mechanism. High and low speed drive is achieved by use of a pivoted intermediate gear drive module having high speed and low speed gear set positions to interconnect the stepper motor input drive gear to the output driven gear. Shifting of the gear module between gear set positions is accomplished by a DC motor operated cam drive mechanism which pivots the gear module selectively between the high speed and low speed gear set positions. The cam drive mechanism includes a camming slot having dwell segments at each end of the slot. An open loop control gear mesh procedure includes is also described for meshing the high speed and low speed intermediate gear drives with the input drive gear and output driven gear. In this procedure, the cam drive mechanism initially drives the gears toward mesh and then reverses the cam drive by a limited amount. If the input drive gear properly meshed with the intermediate gear drive, the dwell segment prevents the gear from being unmeshed. If stubbing occurred, the cam drive is still in the drive segment of the cam and backs the intermediate gear drive away while the stepper is activated by a partial tooth pitch. The cam drive is then driven forward again to engage the intermediate gear with the input gear. The stepper motor is then driven forward and back by equal amounts to clear any stub condition that might still exist between the intermediate gear and output driven gear interface. The open loop control routine avoids the need for complex and costly active feedback mechanisms to detect and clear a gear stubbing condition during gear shifting.

7 Claims, 8 Drawing Sheets

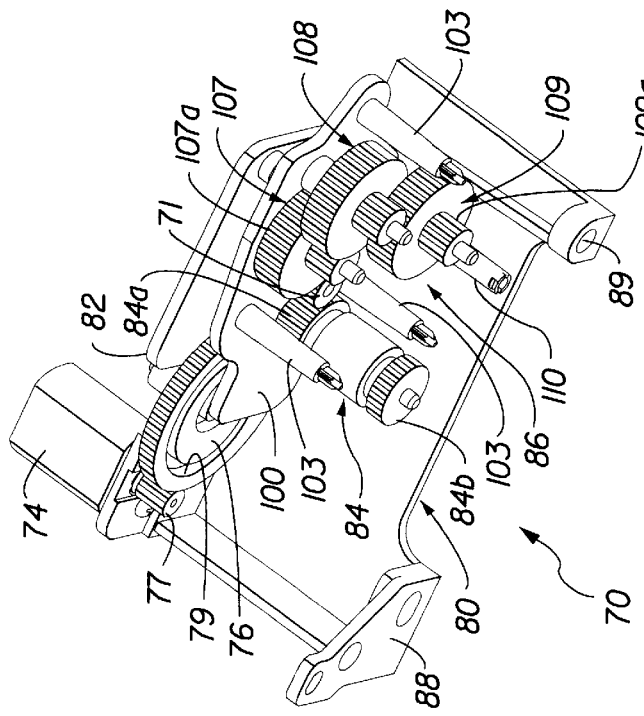
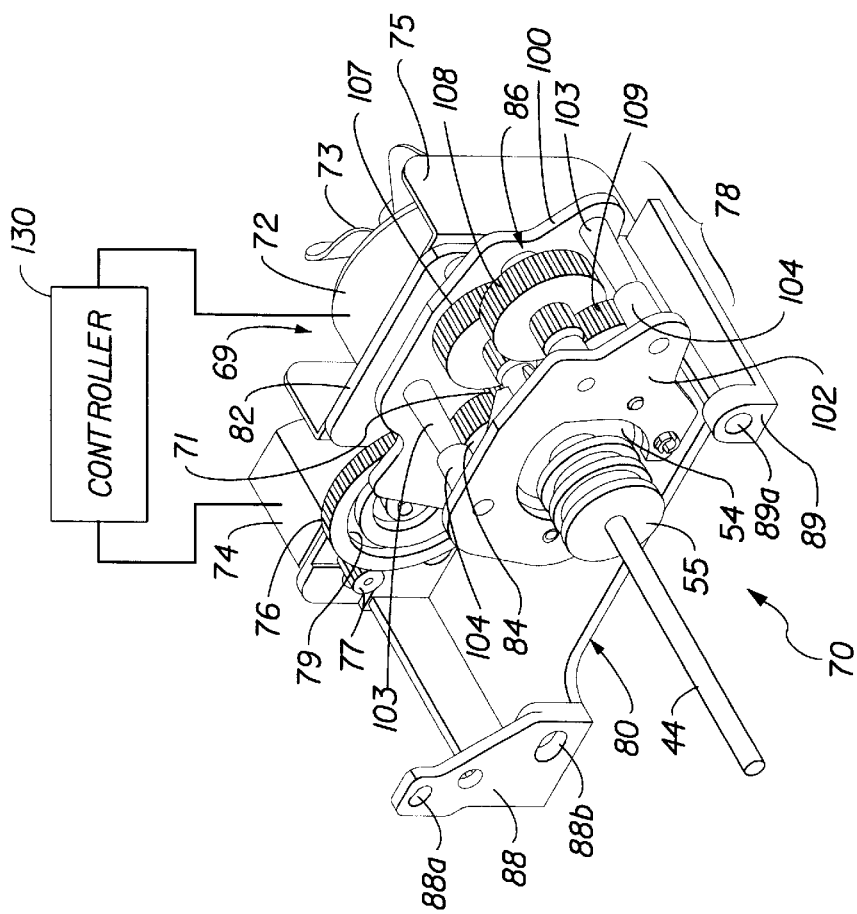
FIG. 4b
FIG. 4a

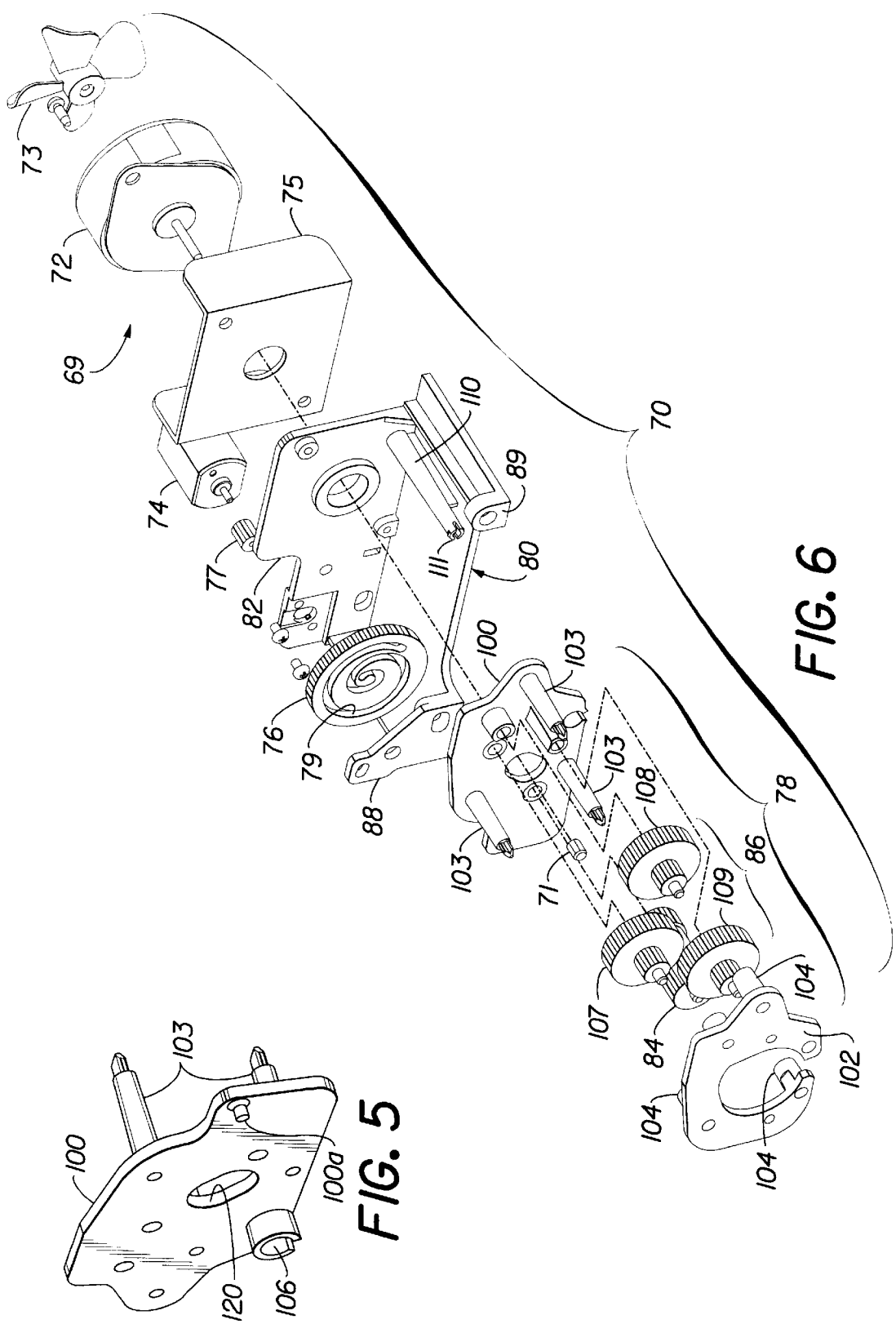

BI-DIRECTIONAL, DUAL SPEED FILM TRANSPORT GEAR DRIVE APPARATUS WITH AN OPEN LOOP CONTROL GEAR MESH ROUTINE

CROSS-REFERENCE TO RELATED APPLICATION

Cross-reference is hereby made to copending, commonly assigned U.S. application Ser. No. 09/162,902, entitled "BI-DIRECTIONAL, DUAL SPEED FILM TRANSPORT GEAR DRIVE APPARATUS" filed concurrently herewith.

FIELD OF THE INVENTION

The present invention relates generally to the field of photographic film scanners and, in particular, to two-speed gear drive apparatus that selectively operates film transport drive mechanisms at in forward and reverse directions at selectable, widely disparate speeds by selectively meshing one of plural intermediate gear drives with an input drive gear and an output driven gear.

BACKGROUND OF THE INVENTION

Film transport mechanisms used in photographic film scanners can be configured with DC or AC motors, stepper motors or servo motors used to operate the transport mechanism at different film transport speeds. Film scanners require precise positioning of the film strip, particularly during the image scanning operation for quality results. Drives for this purpose typically include DC motors with position feedback using encoder wheels or disks. Transport speed can be changed by varying the voltage supplied to the DC motor thus making the selection of appropriate operating speed a relatively simple matter. However, the requirement for precise positioning makes the feedback control with encoder wheels a complex and relatively costly approach to transport design. Stepper motor drive systems have the advantage that precise positioning can be readily achieved. However, a film scanner having a high/low speed ratio of, for example, on the order of 40 to 1, requires that a relatively costly stepper motor be used to realize such a high range of speed variation since inexpensive stepper motors are generally limited to a low range of speed variation. For film scanners intended to be mass produced for consumer applications, it is necessary to minimize the product cost which mitigates against use of the more costly stepper motor transport designs.

In the above cross referenced U.S. Application, a pivoted gear module is employed to selectively engage a high speed or low speed intermediate gear drive between an input drive gear attached to a low cost, limited range stepper motor, and an output driven gear attached to a film drive apparatus. The gear module is pivoted by means of a cam disk driven by a reversible DC motor. When shifting gears from one intermediate drive to another, the input load should be applied only when the teeth are in adequate mesh to prevent tooth damage. This requires that the gears are set to the correct center distance to ensure that the contact ratio is greater than or equal to one, meaning that there is always at least one tooth of the driving gear in contact at the involute surface with one tooth of the driven gear at its involute surface. Alignment of the input drive gear and the output driven gear teeth to the teeth of the intermediate gears is important in order to swing the intermediate gear module fully into position. If the teeth on the input drive gear are oriented in such a way to the intermediate gear drive teeth that either a tip to tip contact condition or two teeth on the input drive gear straddling two teeth on the intermediate gear drive results, then the gear teeth will not be fully engaged. The same situation can occur at the intermediate gear drive to output driven gear interface. These interference conditions are referred to herein as "stubbing" of the gear teeth. If a stubbing condition at either or both of the gear interfaces during the gear meshing procedure, then the intermediate gear drive will not fully engage with the input drive gear and output driven gear and the drive torque will not be properly transmitted to the driven output gear. It is known to use active sensing and feedback mechanisms to detect the occurrence of stubbing and provide feedback to initiate corrective actions to clear the stub condition. However, these mechanisms can be complex and require added components and cost to the gear shift mechanism. There is therefore a need for an arrangement that ensures proper meshing of intermediate gear drives to input drive and output driven gears in a dual speed gear shift mechanism particularly for a film drive apparatus that does not require active feedback mechanisms to detect and clear gear stub conditions and that maintains accurate relational position of the drive motor setting to the film drive positioning. The present invention satisfies that need.

SUMMARY OF THE INVENTION

In accordance with the invention, there is provided dual speed film transport gear drive apparatus that comprises a film drive stepper motor having an input drive gear; an output driven gear; a movable gear module having first and second intermediate gear drives adapted for movement between first and second drive positions in which one of the first and second intermediate gear drives is selectively meshed with the input drive and output driven gears, the gear module having a cam follower; and a gear shift unit including a cam drive motor and a cam having a cam slot engaged with the gear module cam follower, the cam slot having extended dwell zones at each end of travel of the cam separated by a gear shift drive zone. The dual speed gear drive apparatus also includes a controller which is operative, using open loop control, to cause movement of the gear module between the first and second positions meshing a selected one of the intermediate gear drives with the input drive gear and the output driven gear by performing the following operations:

(a) driving the cam drive motor forward for a first predetermined amount of time sufficient normally to drive the gear module to the selected one of the positions with the cam follower in a dwell segment corresponding to the selected position;

(b) driving the cam drive motor in reverse to move the cam through a length of travel equivalent to a predetermined portion of the dwell segment;

(c) driving the stepper motor through a fraction of a tooth pitch on the input drive gear;

(d) driving the cam drive forward for a second predetermined amount of time sufficient normally to drive the gear module to the selected one of the positions; and (e) driving the stepper motor in a first direction for a plurality of input drive gear tooth pitches followed by driving the stepper motor in reverse for an equal number of input drive gear tooth pitches.

With this open loop control arrangement, any stubbing between the input drive gear and intermediate gear drive is first cleared by steps (a)–(d) and thereafter any stubbing between the intermediate gear drive and the output driven gear is cleared by step (e). If no stubbing of the gears has occurred, the dwell segment of the cam drive prevents unmeshing of the input drive gear and intermediate gear drive during steps (b) through (d) above.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 4a is an isometric view of a dual speed, film transport gear drive apparatus of the present invention;

FIG. 4b is another isometric view of the gear drive of FIG. 4a with some of the structure omitted to better view the dual speed gear drive structure employed;

FIG. 5 is an isometric view of the rear gear plate in the apparatus of FIG. 4a showing the cam follower used in the shifting of the gear drive between high and low speed operation;

FIG. 6 is an exploded isometric view of the drive apparatus of FIG. 4a;

FIG. 10 is a schematic illustration of a cam drive disc used in the controlled shifting of gears in the gear drive apparatus of FIG. 4a; and FIG. 11 is a program flow chart for a gear mesh procedure used in the gear drive apparatus of FIG. 4a.

DETAILED DESCRIPTION

Figure 1:
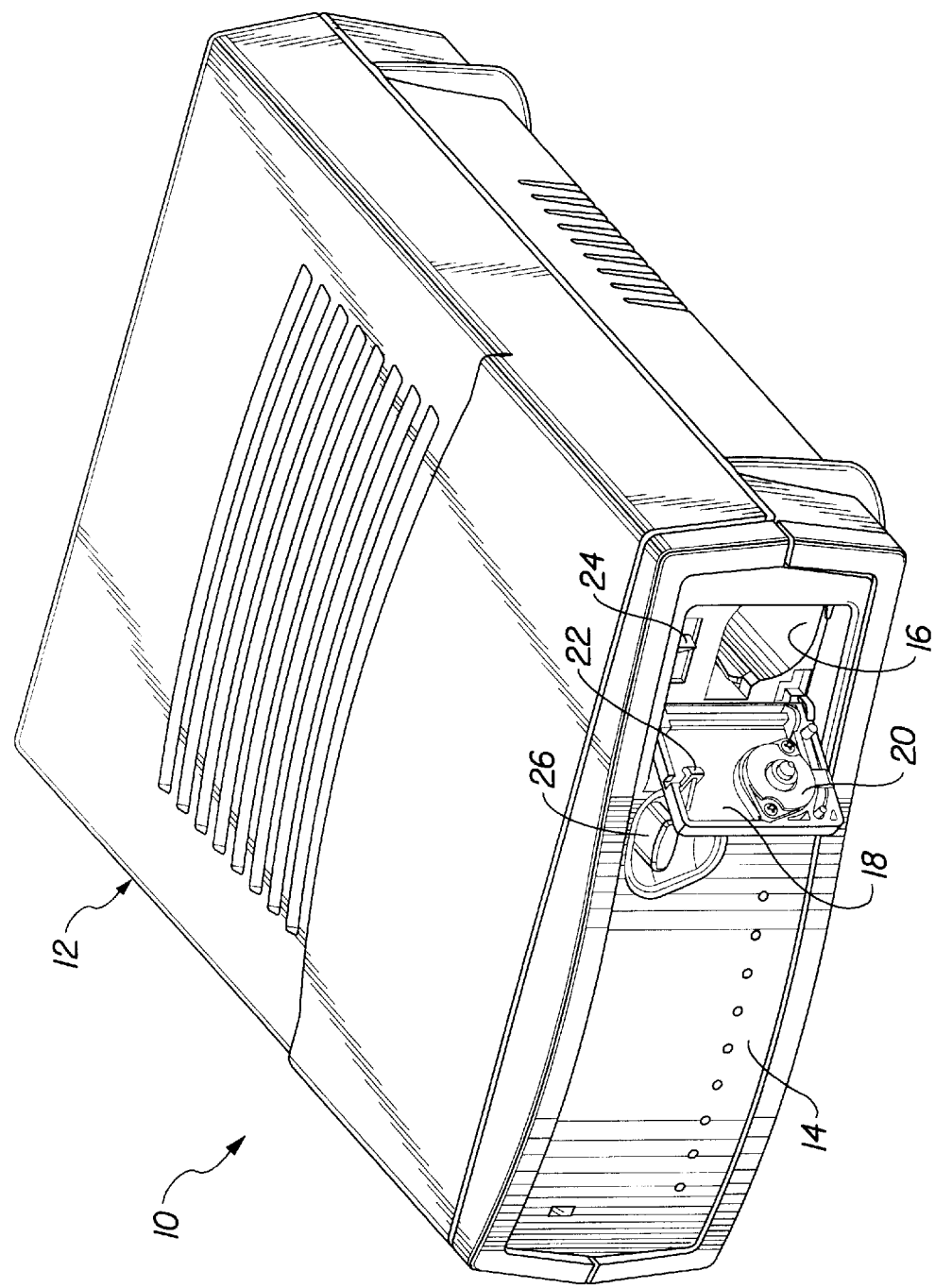
FIG. 1 is an isometric exterior view of a film scanner embodying the present invention.

In FIG. 1, there is shown a compact film scanner 10 adapted for use with APS film cartridges to convert film images to digital images. The illustrated scanner comprises an outer casing 12 and a front bezel 14 which enclose an internal film drive chassis to be described in more detail below. The chassis is provided with an APS film cartridge chamber 16 for receiving a manually inserted APS film cartridge. A hinged, spring-loaded door 18 includes a locating device 20 which acts to engage the end of the inserted film cartridge (not shown) as the door is closed to aid in properly positioning the film cartridge in the chamber 16. A latch hook 22 on the door engages an internal latching mechanism 24 to lock the door in the closed position. When it is desired to remove the film cartridge, a door release button 26 is actuated to unlock the latch mechanism allowing the door to spring open. An internal spring loaded mechanism (not shown) within the cartridge chamber forces the cartridge partially outward, allowing the user to grasp and remove the cartridge.

Figure 2:
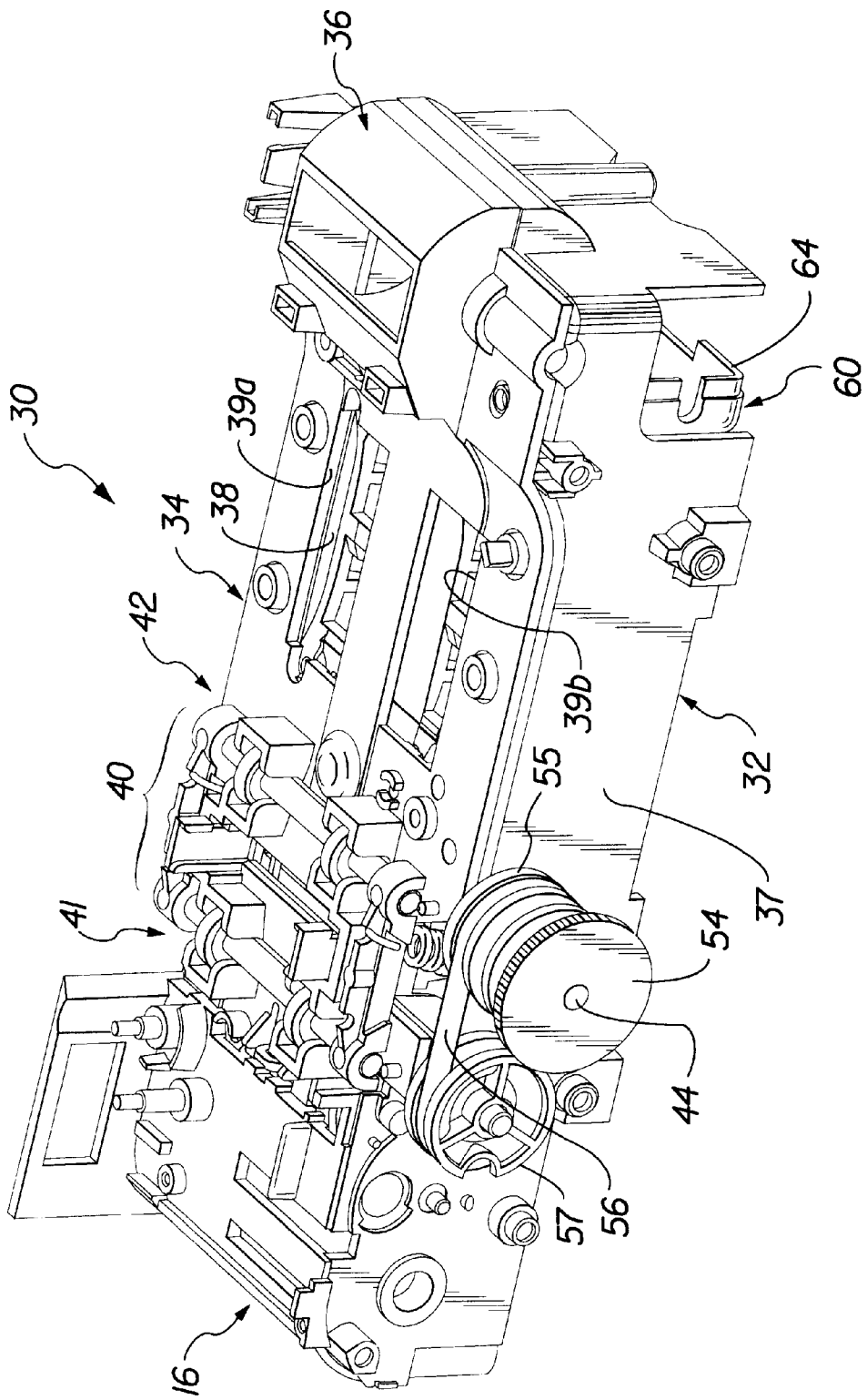
FIG. 2 is a perspective view of a film scanner chassis including film transport drive mechanism useful with the dual speed gear drive apparatus of the present invention.

Referring to FIG. 2, a general description of the internal film drive chassis 30 of the scanner 10 is presented here. The illustrated chassis comprises a lower frame 32 and an upper plate 34 which, when assembled as shown, define the film cartridge chamber 16, a film takeup chamber 36 and a film path 38 longitudinally extending between the two chambers. A film transport drive roller mechanism 40, including nip roller sets 41 and 42, is located near the film cartridge chamber 16. A pair of elongated apertures 39a, 39b are provided in upper plate 34 between the nip roller sets and the takeup chamber to allow access by magnetic read/write heads (not shown) to magnetic data tracks on the magnetic recording layer formed on the APS film as the film is driven along the film path, thereby enabling data transfer to and from the film magnetic layer, in known manner, as part of the film scanning process. Lower frame 32 is provided with depending skirt walls 37 that form a cavity in which is mounted imaging apparatus 60.

Figure 3:
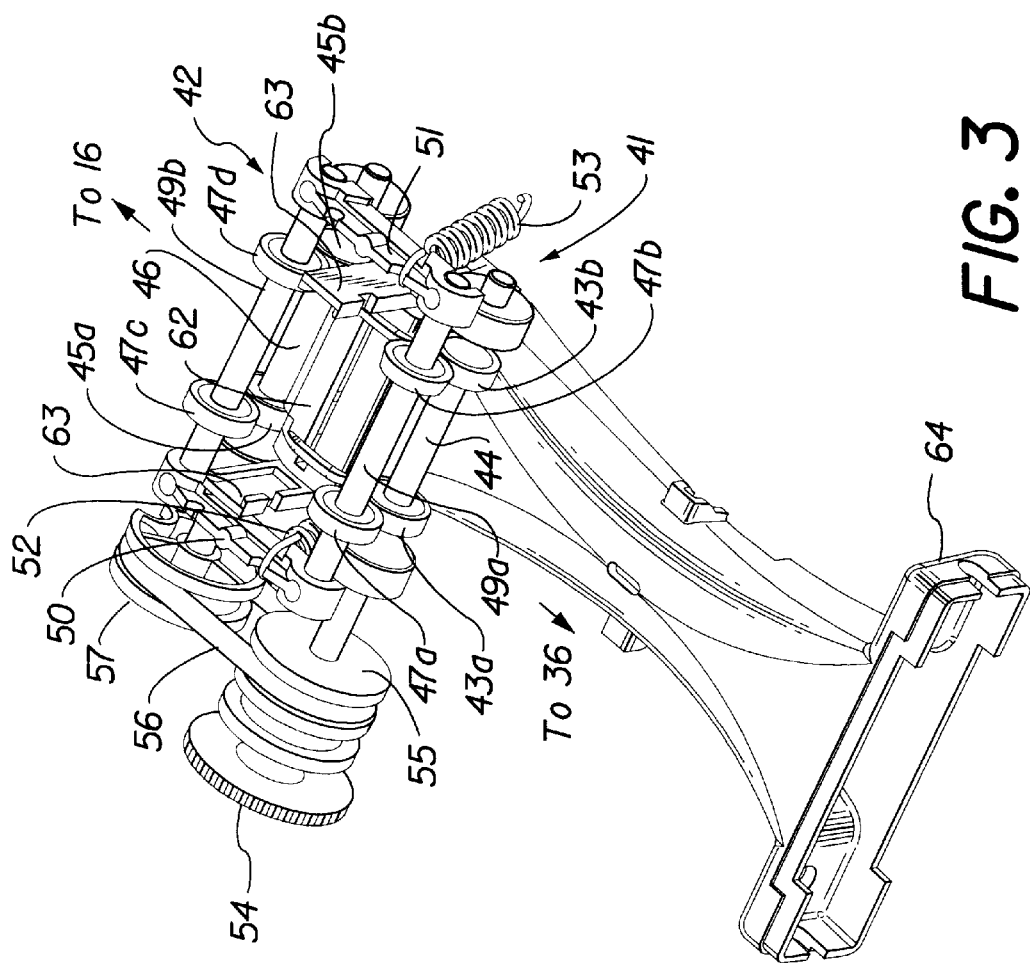
FIG. 3 is a perspective view of portions of the film scanner showing film transport apparatus and an imaging housing assembly.

Referring to FIG. 3, film transport drive apparatus 40 and imaging apparatus 60 are shown isolated from the surrounding chassis elements 32 and 34 for ease of visualization and description. One end of the imaging apparatus 60 comprises a film scanner end 62 which is snap mounted into a film scanner opening formed in the chassis 30. An elongated light source (not shown) is mounted on retention arms 63 to shine light through film in the scanner end 62 and into an optical light path internal to the imaging apparatus 60. The opposite end of imaging apparatus 60 comprises an image sensor housing 64 in which a linear CCD image sensor (not shown) is mounted. The film scanner end 62 is straddled by film transport drive apparatus 40 comprising film drive nip roller sets 41 and 42. Nip roller set 41 comprises main drive rollers 43a, 43b mounted on main drive shaft 44 and pressure rollers 47a, 47b mounted on shaft 49a. Nip roller set 42 comprises slave drive rollers 45a, 45b mounted on slave drive shaft 46 and pressure rollers 47c–47d are mounted on shaft 49b. The pressure rollers are held in compression against the drive rollers by means of pressure clamps 50 and 51 and tension springs 52 and 53, respectively. The main drive rollers are drivingly coupled to the slave drive rollers by means of main drive pulley 55, elastic drive belt 56 and slave drive pulley 57. Gear 54 is pressed on the end of main drive shaft 44 and comprises an output driven gear forming part of the dual speed gear drive apparatus described herein. The imaging apparatus 60 is described more fully in copending, commonly assigned U.S. patent application Ser. No. 09/83,604, filed May 22, 1998, entitled "Imaging Apparatus for a Photographic Film Image Scanner", the disclosure of which is incorporated herein by reference. The film transport drive apparatus 40 is described more fully in copending, commonly assigned U.S. patent application Ser. No. 09/085,730, filed May 27, 1998, entitled "Film Drive Apparatus for a Photographic Film Scanner", the disclosure of which is incorporated herein by reference.

Turning now jointly to FIGS. 4–6, there will now be described the bi-directional, dual speed gear drive apparatus 70. This gear drive is used to drive the film transport drive apparatus 40 in forward and reverse directions in a selectable one of a high or low film transport speed of widely disparate speed settings. Drive apparatus 70 comprises a support frame 80 having a rear mounting plate 82 and a pair of front mounting plates 88 and 89. Rear mounting plate 82 supports a film transport drive motor unit 69 including a stepper motor 72, an optional shield 75 and cooling fan 73. Stepper motor 72 is reversible for driving the film transport mechanism 40 selectively in either a forward or reverse film transport direction. Stepper motor 72 is preferably a low cost motor having a limited step range of, for example, 200 to 600 pulses per second. The shaft of stepper motor 72 extends through an opening in the rear mounting plate 82 and has a pinion 71 mounted thereon, the pinion 71 comprising an input drive gear of the gear drive apparatus 70. Gear 54 mounted on main roller drive shaft 44 of the film transport apparatus 40 comprises an output driven gear of the gear drive apparatus 70. The input drive gear and output driven gear are mounted in fixed coaxial orientation.

The gear drive apparatus 70 further comprises a movable gear module 78 having a rear gear plate 100 and a forward gear plate 102. The gear plates are held in spaced apart relationship by stanchions 103 pressed into mounting bosses 104. A pair of intermediate gear drives 84 and 86 are rotatably supported between the gear plates. Gear drive 84, as best seen in FIG. 4b, is an integral shaft with an input gear 84a and an output gear 84b having a low speed reduction ratio of, for example 4:1, and serves as a high speed intermediate gear drive 84. Gear drive 86, comprises a cluster of three compound, speed reduction gears 107, 108 and 109 having a relatively high speed reduction ratio, for example 150:1, and serves as the low speed intermediate gear drive. The gear module is pivotably mounted on post 110 cantilevered from rear mounting plate 82. To this end, rear gear plate 100 is provided with a spacer collar 106 which slips over the post 110. The forward gear plate is supported and held freely in place on snap fingers 111 formed on the free end of post 110. Rear gear plate 100 additionally includes an elongated aperture 120 to provide clearance for input drive gear 71 as the gear module is pivoted.

The gear drive apparatus 70 further includes a gear shifting mechanism comprising a gear shifting cam disc 76 driven by the reversible DC motor 74 via a pinion gear 77 extending through the rear mounting plate 82 and engaging gear teeth formed on the perimeter of the cam disc. The face of the cam disc has a generally spiral cam slot 79 which engages cam follower pin 100a formed on the back side of rear gear plate 100. The spacer collar 106 on gear plate 100 establishes the necessary space between the rear gear plate and the rear mounting plate 82 to allow engagement of the cam disc with the cam follower pin. Stepper motor 72 and DC motor 74 are controlled by a separate drive controller 130 in a manner described in detail below.

Figure 7:
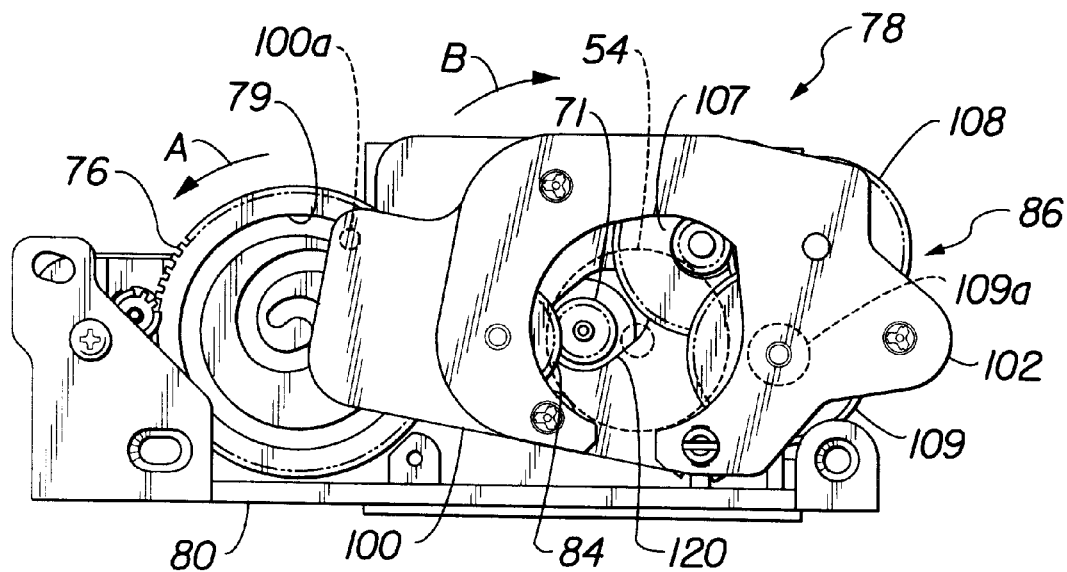
FIGS. 7 and 8 are end elevation views of the drive apparatus of FIG. 4 useful in explaining the gear shifting operation of the apparatus.
Figure 8:
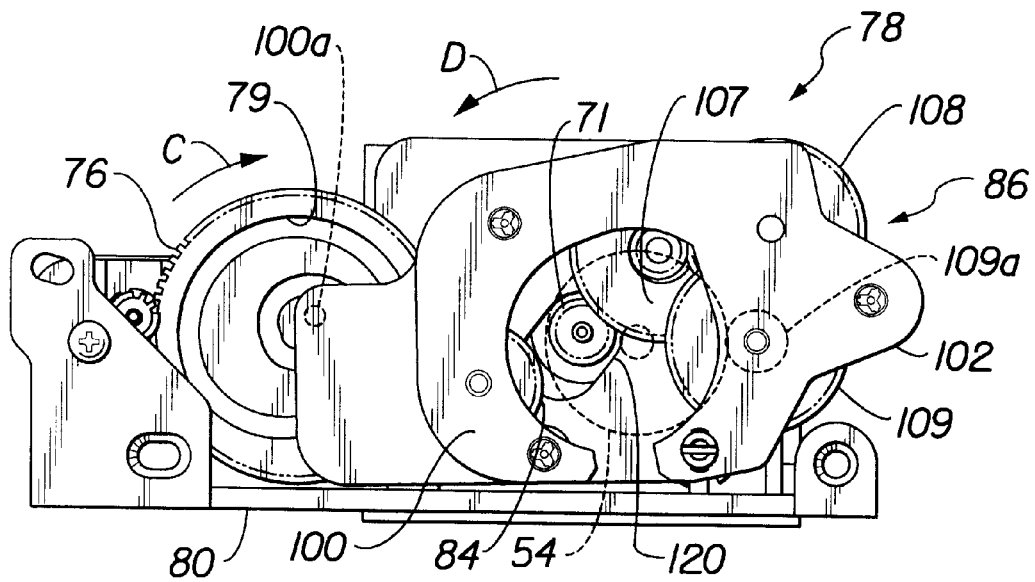

In operation, with reference first to FIG. 7, when it is desired to operate the film transport drive in the high speed mode, DC motor 74 is actuated by controller 130 to drive the cam disc 76 in the counterclockwise direction as shown by arrow A in FIG. 7 thereby driving the cam follower pin 100a on the rear side of gear plate 100 toward the outer circumference of the disc 76 which pivots the gear module 78 in the clockwise direction as shown by arrow B. This motion of the gear module disengages the low speed intermediate gear drive 86 from the input drive gear 71 and output driven gear 54, shown in dotted outline and engages the high speed intermediate gear drive 84 with the input drive gear 71 and the output driven gear 54. Similarly, with reference now to FIG. 8, when it is desired to operate the film transport in the slow speed mode during image scanning, DC motor 74 is actuated in the reverse direction to drive the cam disc 76 in the clockwise direction as shown by arrow C. The camming action of the cam disc on cam follower pin 100a drives the follower inward on the disc. This action pivots the gear module 78 in the counterclockwise direction shown by arrow D which disengages the high speed gear drive 84 from the input and output gears 71 and 54 and engages gears 107 and 109a of the low speed intermediate gear drive 86 with the input and output gears 71 and 54, respectively.

With the low speed intermediate gear drive 86 meshed with the input and output gears, film transport speeds in the range of 1 mm/second can be achieved. With a stepper motor step range of 200–600 pulses per second, a variety of scan resolutions can be achieved in this speed range. With the high speed intermediate gear drive engaged between the input and output gears, transport speeds in the range of 100 mm/second are achieved. Thus a significant shift in film transport speeds is achieved with a low cost stepper motor operating in a relatively narrow range of step rates.

Figure 9A:
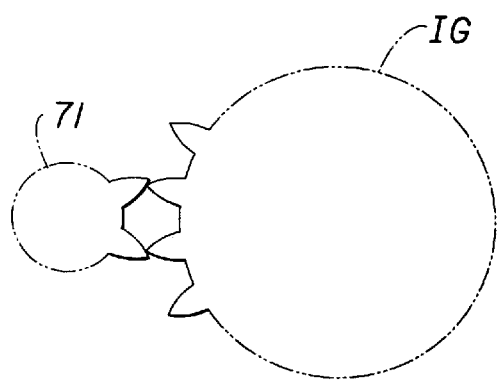
FIGS. 9a and 9b are diagrammatic illustrations of gear features useful in explaining the gear-meshing operation of the drive apparatus of FIG. 4.
Figure 9B:
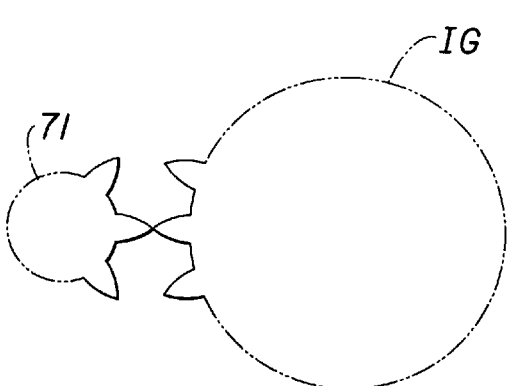

It will be appreciated that alignment of the teeth of the input drive gear 71 and the output driven gear 54 to the teeth of the selected intermediate gears is important in order to swing the intermediate gear module fully into position. If the teeth on the input drive gear are oriented in such a way to the intermediate gear teeth that two teeth on the input drive gear 71 straddle two teeth on the intermediate gear IG, as shown in FIG. 9a, or a tip to tip contact condition exists, as shown in FIG. 9b, then the gear teeth will not be fully engaged. These conditions are referred to herein as "stubbing". The same situation can occur at the intermediate to output driven gear interface. If either of these conditions occur or if both occur simultaneously, then the intermediate gear module 58 will not fully engage with the pinion and output gear and the drive torque from the stepper motor 72 will not be properly transmitted to the driven output gear 54.

Figure 10:
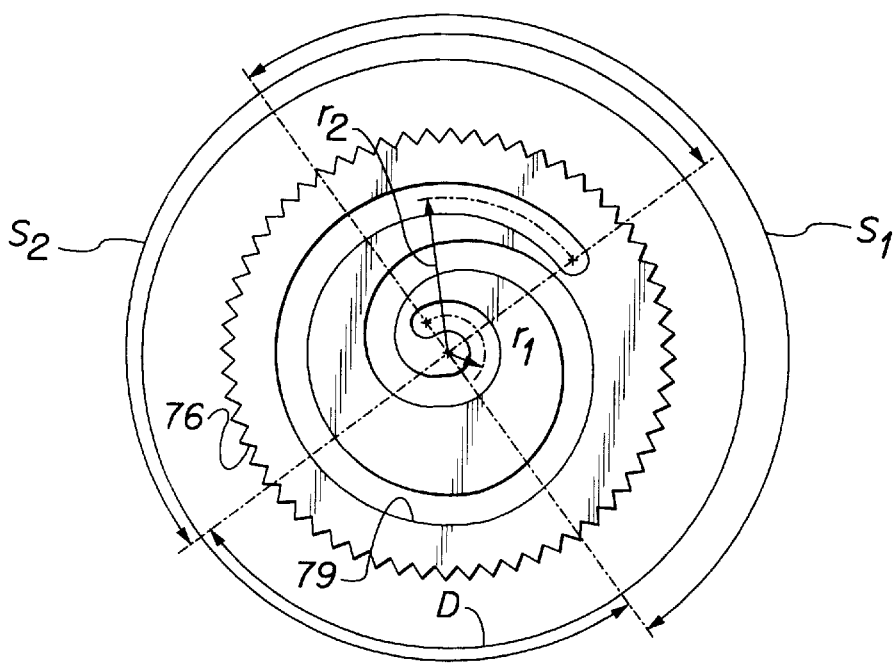

There will now be described a mechanism and procedure in accordance with the present invention by which proper meshing is ensured before the stepper motor drive is actuated to advance film in the scanner at either high or low speed. Referring to FIG. 10, the cam slot 79 of the gear shift cam 76 has a cam profile that includes three main segments: a low speed segment $S_1$ with a constant radius $r_1$ for approximately 180°, a constantly increasing radius segment D, which moves the gear module between the low speed and the high speed positions, and a high speed position with constant radius $r_2$ for approximately 180°. The function of the constant radius segments is to set the appropriate gear center distance the intermediate gear drive and both the input drive gear and output driven at a distance produces a contact ratio between the teeth greater than or equal to one in accordance known practice (meaning the involute surface of the gear teeth are always in contact with each other as the gears rotate). The 180 degrees of dwell at these positions allows for substantial variability in cam rotation during the gear mesh procedure without affecting gear engagement. The amount of dwell also allows the cam to be rotated back and forth less than the amount of dwell without moving the gears from the optimum meshed position. A programmable controller 140 (FIG. 4a) is coupled to the DC motor 74 and the stepper motor 72 and is programmed to perform open loop gear shift control procedure as will now be described.

Figure 11:
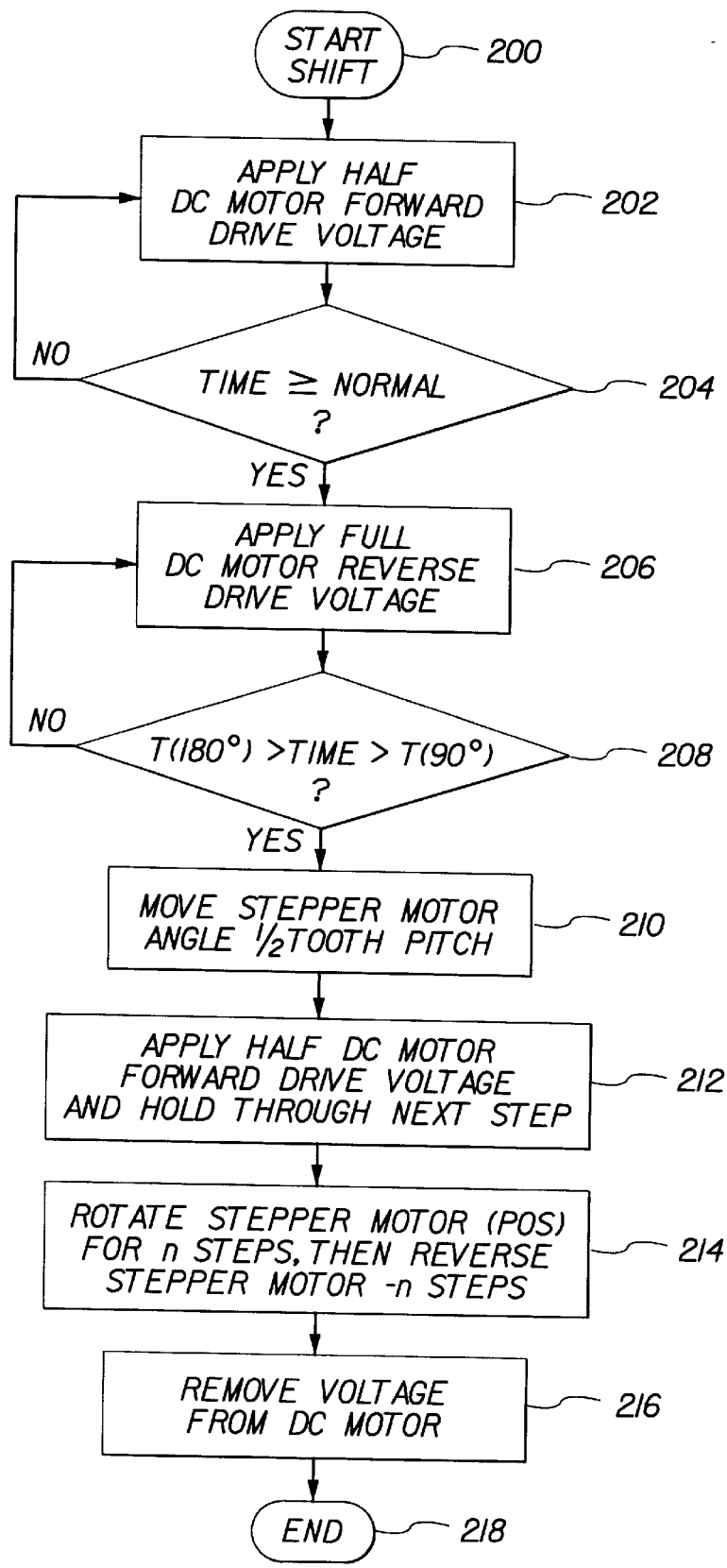

The flow chart of FIG. 11 illustrates the basic gear shift procedure. The shift routine starts at step 200. At step 202, half voltage (2.5 V out of a possible 5.0 V) is applied to the DC motor which drives the cam from the low speed to high speed or high speed to low speed position depending on the polarity of the applied voltage. Step 204 maintains power to the DC motor for a fixed amount of time, longer than characteristic time the shift system takes to fully shift from one to the other intermediate gear drive. If the teeth of all three gears, that is, the input drive gear, output driven gear and intermediate gear drive, are aligned properly then the cam 76 fully rotates and the cam follower pin 100a on the gear module 100 is at the corresponding end of the cam slot 79. If the teeth of the input drive gear or the output driven gear are stubbed on the intermediate gear drive as described above, then the cam does not fully rotate and stops with the cam follower pin 100a lodged in the drive segment D, short of the corresponding constant radius dwell segment $S_1$ or $S_2$ of the cam slot 79. It should be recalled that, because this is an open loop control, the mesh condition of the gears is not known at this stage.

Steps 206 and 208 apply full voltage (5.0 V) to the DC motor in the opposite direction for a time long enough to rotate the cam more than 90 degrees but less than the total dwell angle of 180 degrees. If the shift in steps 202 and 204 was successful and the cam 76 had fully rotated, then this movement within the dwell segment does not change the engagement of the gear teeth and the teeth stay in full mesh. If the teeth had stubbed and the cam had not fully rotated then this movement backs the gear teeth away from each other since the cam follower pin 100a was lodged in the drive segment D at the conclusion of step 204.

At step 210, the stepper motor is actuated to move the input drive gear teeth slightly less than one half the tooth pitch of the input drive gear. This realigns the input drive gear teeth with the mating intermediate gear drive teeth. If the initial shift had fully rotated the cam the movement in steps 203 and 204, the teeth remained in mesh during the reversal of the DC motor and this latter of the stepper motor input drive merely nudges the intermediate gear. If the initial movement resulted in a tooth stub and the second step backed the gears away from each other then the stepper motor movement realigns the teeth such that they are not in an orientation that causes stubbing of the intermediate gear teeth with the input drive gear teeth. At step 212, half voltage (2.5 V) is applied to the DC motor in the forward direction to drive the cam toward the fully rotated position. This half voltage is maintained during the next step 214. If the only stubbing condition that had existed was between the input drive gear and the intermediate gear drive, steps 206–210 would have cleared the condition and step 212 would then result in full meshing of the intermediate gear drive with both the input drive gear and the output driven gear. However, if stubbing of the intermediate drive gear with the output driven gear had also existed and was not incidentally cleared during the course of steps 206–212, then the output side stub still exists at the conclusion of step 212 and the cam may not fully rotate. It may be noted at this point that stubbing on the output side is something of an unstable condition.

In the next step 214, the stepper motor is actuated in one direction for a fixed number of steps and then reversed for the same number of steps. During this move, if the stub at the output gear interface still exists, the input drive gear to intermediate gear mesh is enough to turn the intermediate gear, thereby driving the stub condition off. At this instant, since power is still being supplied to the DC motor, the cam then rotates to drive the gear module fully into position. Preferably the amount of stepper motor rotation in each direction is at least one full revolution and more preferably is two full revolutions. This equal amount of rotation in each direction returns the position of the motor to where it was at the beginning and maintains the proper alignment of the motor step count to the film position in the film gate of the scanner. The equal movements of the stepper motor result in negligible change in the position of the output gear if the initial shift was successful and a tolerable change if the last stepper movement cleared the output gear tooth stub. Step 216 then removes power from the DC motor driving the cam and the gear shift routine ends at step 218.

The advantages of the gear mesh procedure just described are that the two speed gear mechanism can operate in "open loop" manner thus avoiding the need for an additional position sensor and related electronic circuitry to detect the occurrence of a gear stubbing condition; and also it ensures that the intermediate gear mechanism is always fully engaged with the stepper motor input drive gear and the output driven gear thereby minimizing the chance of gear damage during operation.

The invention has been described in detail with particular reference to certain preferred embodiments thereof, but it will be understood that variations and modifications can be effected within the spirit and scope of the invention.

What is claimed is:

1. A method of operating a dual speed film transport gear drive apparatus of the type having:

film drive stepper motor having an input drive gear;

an output driven gear;

a movable gear module having first and second intermediate gear drives adapted for movement between first and second drive positions in which one of said first and second intermediate gear drives is selectively meshed with said input drive and output driven gears, the gear module having a cam follower;

a gear shift unit including a cam drive motor and a cam having a cam slot engaged with said gear module cam follower, the cam slot having extended dwell zones at each end of travel of the cam separated by a gear shift drive zone; and a controller operative, using open loop control, to cause movement of said gear module between said first and second positions meshing a selected one of said intermediate gear drives with said input drive gear and said output driven gear by performing the following steps comprising:

(a) driving said cam drive motor forward for a first predetermined amount of time sufficient to drive said gear module normally to the selected one of said positions with said cam follower in a dwell segment corresponding to said selected position;

(b) driving said cam drive motor in reverse to move said cam through a length of travel equivalent to a predetermined portion of said dwell segment;

(c) driving said stepper motor through a fraction of a tooth pitch on said input drive gear; and (d) driving said cam drive forward for a second predetermined amount of time sufficient normally to drive said gear module to said selected one of said positions;

whereby any stubbing between said input drive gear and intermediate gear drive is cleared by steps (a)–(d) and, if no stubbing of said gears has occurred, said dwell segment of said cam drive prevents unmeshing of said input drive gear and intermediate gear drive during step (b).

2. The method of claim 1 wherein said controller is operative after step (d) to perform the additional step of:

(e) driving said stepper motor in a first direction for a predetermined number of motor steps followed by driving said stepper motor in reverse direction for an equal number of motor steps;

whereby any stubbing between said intermediate gear drive and said output driven gear is not cleared by steps (a)–(d) is cleared by step (e).

3. The method of claim 1 wherein said gear module is pivotably mounted, said cam comprises a rotatable disk having a face surface and said cam slot is formed in said face surface generally in the shape of a spiral with dwell segments at each end of the slot, each dwell segment having a predetermined length of constant radius.

4. The method of claim 3 wherein said dwell segments are each approximately 180° of circumferential length.

5. The method of claim 3 wherein in step (b) said predetermined portion of said dwell segment is about 90°.

6. The method of claim 2 wherein in step (e) said stepper motor is driven by an equal amount of rotation in each of said first and second directions, said amount of rotation being at least one revolution.

7. The method of claim 6 wherein said amount of rotation is about two revolutions.

* * * * *